July 2, 1968  R. G. HENTSCHEL  3,391,336
EDDY CURRENT NONDESTRUCTIVE TESTING APPARATUS HAVING
ADJUSTABLE OUTPUT SIGNAL CONVERSION MEANS
Filed Oct. 20, 1965  2 Sheets-Sheet 1

INVENTOR.
RUDOLF G. HENTSCHEL
BY
Olsen and Stephenson
ATTORNEYS

INVENTOR.
RUDOLF G. HENTSCHEL
BY
Olsen and Stephenson
ATTORNEYS

United States Patent Office 3,391,336
Patented July 2, 1968

1

3,391,336
EDDY CURRENT NONDESTRUCTIVE TESTING APPARATUS HAVING ADJUSTABLE OUTPUT SIGNAL CONVERSION MEANS
Rudolf G. Hentschel, Ann Arbor, Mich., assignor to Automation-Forster, Inc., a corporation of Michigan
Filed Oct. 20, 1965, Ser. No. 498,490
4 Claims. (Cl. 324—40)

ABSTRACT OF THE DISCLOSURE

This disclosure relates to eddy current nondestructive testing apparatus wherein an output signal is generated which has an amplitude and phase which are dependent upon a characteristic of the workpiece. Means are provided for resolving the singal to produce a signal having an amplitude that varies solely as a function of the characteristic and is independent of the phase angle.

---

This invention relates to a non-destructive eddy current testing apparatus of the type disclosed in United States Letters Patent No. 2,806,992, entitled, "Measuring and Testing Instruments," granted Sept. 17, 1957, in the name of Friedrich Foerster.

One of the testing devices disclosed in the Foerster patent provides a visual representation of the impedance plane for a test coil into which structures under test are placed. Such a device is sometimes referred to as a vector point display system since the apparent impedance of the test coil is presented on a cathode ray tube as a spot having magnitude and direction corresponding to the apparent impedance of the test probe. In general a pair of differential coils, one of which serves as a test probe, are excited either indirectly through a primary winding or directly by an alternating current drive signal. The apparent impedance of the probe is determined by characteristics of a test specimen inserted in the probe coil whereas the impedance of the other coil is a standard impedance, as for example an impedance determined by inserting a standard specimen into the other coil. Output signals from the probe and the standard coil are compared to provide a difference signal having phase and amplitude variations corresponding to differences in characteristics between the standard and the test specimens. The difference signal is demodulated by quadrature control signals derived from the drive signal to yield a pair of unidirectional signals which have relative magnitudes determined by the magnitude and phase of the difference signal relative to the magnitude and phase of the drive signal. In general demodulation may be accomplished with sinusoidal control signals one of which is in phase with the drive signal to detect resistive components of the difference signal with the other control signal being 90 degrees out of phase with the drive signal to detect reactive components of the difference signal. Unidirectional voltages developed by demodulation are applied to horizontal and vertical deflection systems of a cathode ray tube to present the difference signal as a vector point whose magnitude and direction are related to differences in the characteristics of the test and standard specimens.

Undesired effects can be suppressed in the presentation by shifting the phase of the two control signals relative to the drive signal and the diffeernce signal while maintaining quadrature relationship between the control signals. The effect of shifting the phase of the control signals is to resolve the apparent probe impedance into different orthogonal impedance components, so that selected variations in the apparent probe impedance with different test specimens are presented on the cathode ray tube by vector points displaced in a predetermined direction, usually along the horizontal or the vertical deflection axis of the tube. This system is particularly useful for automatic part sorting where selected impedance deviation levels serve as a basis for sorting specimens. With automatic sorting equipment specimens are moved successively past the probe to influence the apparent probe impedance. The phase of the quadrature control signals also controls the entry direction of the spot onto the display and the direction of an apparent impedance path presented by the spot as the impedance of the probe is influenced by specimens moving into and out of the probe. Preferably the phase of the control signals relative to the drive signal is controlled by phase shift circuits or devices that operate over a range of from zero to 360 degrees.

Typical phase shift circuits include differential transformers or reactive circuits having one or more variable capacitors or variable inductors. Such devices are by their nature useful only over a narrow range of test frequencies. Multi-frequency test apparatus operable at different test frequencies over a wide band would require banks of different value impedance elements in the phase shifting devices with each element arranged to be coupled into the phase shift circuit for a given test frequency or a narrow range of test frequencies. This duplication of components increases the cost of construction and assembly, limits versatility of the testing apparatus to some extent depending on the number of components that can be economically incorporated into the testing device and results in relatively complex and bulky circuitry. Eliminating the need for a 360 degree phase shift circuit also permits other simplifications in the testing device.

The objects of the present invention are to provide a multi-frequency eddy current testing device of simple construction and improved operation.

Further objects of the present invention are to provide an eddy current testing device wherein components of an apparent probe impedance or the like are detected directly and then selectively intercombined to provide a desired path for an apparent probe impedance display and for sorting level control depending on variations of a selected characteristic in test specimens.

Another object of the present invention is to provide an improved and simplified method for eddy current testing.

Still further objects of the present invention are to control the apparent impedance path and sorting levels in an eddy current testing device by an apparatus that is frequency independent; that operates effectively; that is constructed simply and economically; that is versatile; and that is simple to operate.

Other objects, features and advantages of the present invention will become apparent from a consideration of the following description, the appended claims and the accompanying drawings in which:

Figure 1:
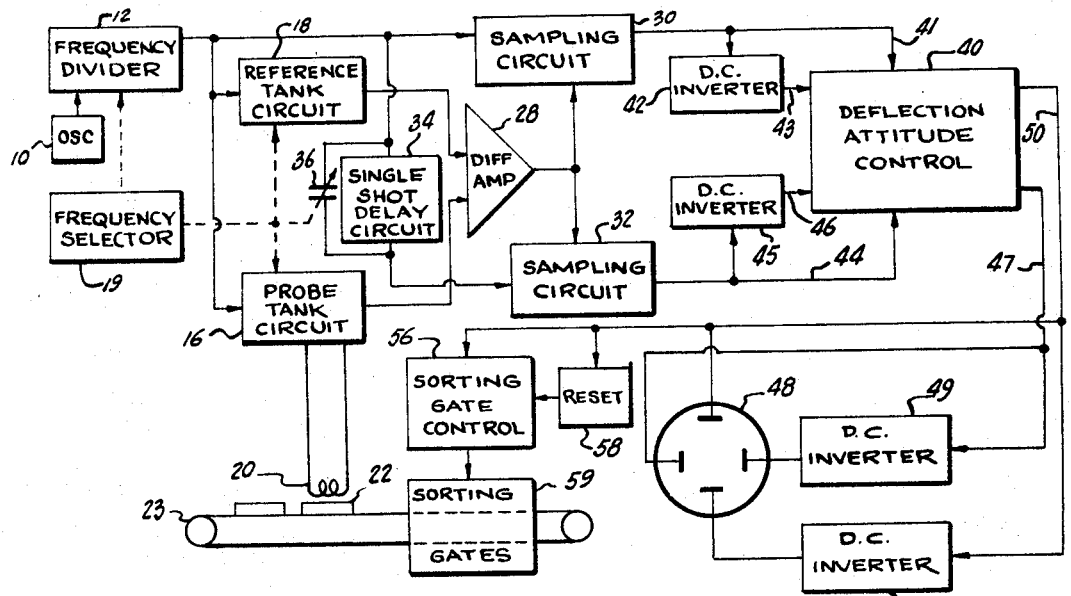
FIGURE 1 is a block diagram of a multi-frequency eddy current testing device including a deflection attitude control of the present invention to selectively vary the display on a cathode ray tube and selectively control operation of sorting gates.
Figure 2A:
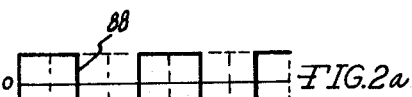
FIGURES 2a–2e illustrate waveforms occurring in the device illustrated in FIG. 1.
Figure 2B:
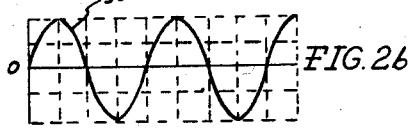
Figure 2C:
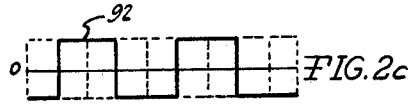
Figure 2D:
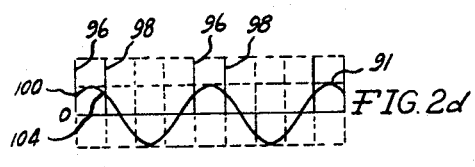
Figure 2E:
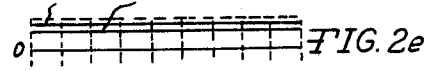

Referring to FIG. 1 an eddy current testing device is illustrated as generally comprising a stable frequency oscillator 10 whose output is connected to a frequency divider 12 to provide square wave drive signals which are applied to a probe tank circuit 16 and to a reference tank circuit 18. Oscillator 10 is a crystal controlled oscillator to provide an alternating current signal at a very precise frequency. Frequency divider 12 may include a series or chain of flip-flop circuits which provide the square wave output. Suitable clipping and shaping circuits (not shown) may be included at the output of divider 12 so that the drive signals to tank circuits 16, 18 are precise square waves. The frequency of the square wave drive signal from divider 12 is controlled by a frequency selector 19 arranged to select the position in the chain at which the square wave output is taken.

Coupled into the probe tank circuit 16 is fixed inductance probe coil 20 adapted to respond to test specimens 22 which are moved past the coil 20 on an endless conveyor 23. As one of the specimens 22 moves past coil 20, the apparent impedance of the coil 20 varies in accordance with characteristics of specimen 22 and is reflected into tank circuit 16. Tank circuit 16 develops a sinusoidal output having phase and amplitude variations representing the characteristics of specimen 22. The output from circuit 16 is applied to a difference amplifier 28 and compared with the output of the reference tank circuit 18 to develop a sinusoidal difference signal representing variations in the characteristics of specimen 22 from a reference or standard impedance of the tank circuit 18. Circuit 18 may be set to a standard impedance by varying reactive and resistive elements in the tank circuit or by influencing the apparent impedance of the tank circuit 18 with a standard specimen in a conventional manner. The difference signal developed by amplifier 28 is applied to a pair of sampling circuits 30, 32. Sampling circuit 30 also receives a square wave control signal from frequency divider 12. The control signal is also applied to a signle shot delay 34 which introduces a 90 degree delay and the delayed square wave control signal is applied to sampling circuit 32. The delay circuit 34 includes a variable capacitor 36 which is mechanically coupled to the frequency selector 19 so that the value of capacitor 36 can be changed for different frequencies to assure a 90 degree phase shift between the control signal applied to sampling circuit 30 and the delayed control signal applied to sampling circuit 32. Capacitor 36 may be a bank of capacitors which are used selectively depending on the particular frequency at which the testing device is being operated. As illustrated schematically in FIG. 1 the probe tank circuit 16 and the reference tank circuit 18 are also coupled mechanically to the frequency selector 19 so that the tank circuits 16, 18 can be tuned to provide sinusoidal outputs at different frequencies.

In response to the control signal from divider 12 the sampling circuit 30 samples the difference signal from amplifier 28 at one phase to develop a unidirectional voltage corresponding to the instantaneous value of the difference signal at that phase. This voltage is related to a first impedance component of the difference signal. Similarly, in response to the delayed control signal from the delay circuit 34, the sampling circuit 32 samples the difference signal from amplifier 28 to develop a second unidirectional voltage corresponding to the instantaneous value of the difference signal at a phase displaced 90 degrees from the sampling phase at circuit 30. The second voltage is related to a second impedance component of the difference signal orthogonal to the first component. In the preferred embodiment the sampling circuits 30, 32 are diode bridge circuits which are gated on and off substantially instantaneously by sharp pulses derived from either the leading or trailing edge of the square wave control signals from divider 12 and delay circuit 34. The sampling circuits 30, 32 also include suitable storage capacitors that hold the instantaneous sampled values of the difference signal until the next cycle of the square wave control signals from divider 12 and delay circuit 34. The unidirectional signal developed by circuit 30 is applied to a deflection attitude control 40 in push-pull (single ended to double ended) fashion through a lead 41 and through a direct current inverter 42 and a lead 43. The unidirectional signal developed by the sampling circuit 32 is also applied to the deflection attitude control 40 in a push-pull fashion through a lead 44 and through a direct current inverter 45 and a line 46. In a manner that will later be described the deflection attitude control 40 converts the unidirectional signals from the sampling circuits 30, 32 into a second pair of unidirectional signals representing any selected combination of orthogonal impedance components in the difference signal.

One of the unidirectional signals from the deflection attitude control 40 serves as a horizontal deflection voltage and is applied to the horizontal deflection plates of an oscilloscope 48 through a line 47 and through a direct current inverter 49. The other of the unidirectional signals from the deflection attitude control 40 serves as a vertical deflection voltage and is applied to the vertical deflection plates of oscilloscope 48 through a line 50 and through a direct current inverter 52. Suitable deflection amplifiers (not shown) may be included in the deflection system for the oscilloscope 48. The vertical deflection signal on line 50 is also connected to a sorting gate control 56 and to a reset circuit 58 for the sorting control 56. The sorting control 56 actuates sorting gates 59 to divert specimens 22 from conveyor 23 into appropriate bins or the like depending on differences in characteristics of the specimens. Although a particular construction of control 56 is not essential to the present invention, in the preferred embodiment control 56 includes a plurality of electronic switching devices which have progressively increasing threshold levels. The threshold levels are correlated to voltage increments of the vertical deflection signal which represent given levels of deviation between different one of the specimens 22. Between inspection of successive ones of the specimens 22 by the probe coil 20 the control 56 is reset by the reset circuit 58.

Figure 3:
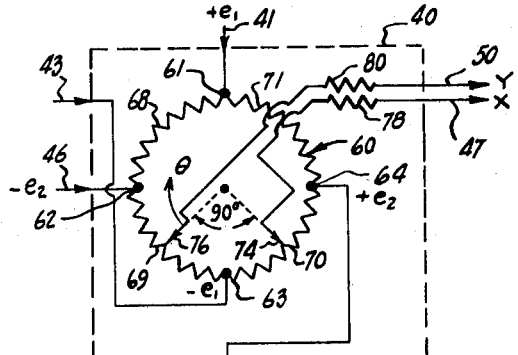
FIGURE 3 is a circuit diagram of one deflection attitude control of the present invention.

One particular embodiment of a deflection attitude control 40 constructed in accordance with the present invention is illustrated in FIG. 3 and comprises a closed loop resistor 60 having a generally circular configuration and being provided with four input terminals 61, 62, 63, 64 which are spaced apart at 90 degrees around the resistor 60. Leads 41, 43 from the sampling circuit 30 and inverter 42 are connected to terminals 61, 63, respectively. Leads 46, 44 from inverter 45 and the sampling circuit 32 are connected to terminals 62, 64, respectively. Terminals 61–64 divide resistor 60 into four impedance arms 68, 69, 70, 71. A pair of wiper arms 74, 76 are mounted for rotation through 360 degrees relative to the resistor 60 to tap orthogonal points on resistor 60 at adjacent ones of the impedance arms 68–71. Arms 74, 76 are electrically isolated. Arm 74 is connected through an output resistor 78 to the lead 47 whereas arm 76 is connected through an output resistor 80 to the lead 50. Arm 76 is disposed at 90 degrees in a clockwise direction as viewed in FIG. 3 relative to arm 74 and is mechanically coupled to arm 74 to maintain the orthogonal relation during rotation of arms 74, 76 through a full 360 degrees.

Resistor 60 may be formed of suitable resistive material such as carbon or wrapped Nichrome wire to cooperate with wiper arms 74, 76 and serve as a potentiometer. Each of the arms 68–71 has an impedance distribution such that when a push-pull signal is applied to the pair of terminals 61, 63, the horizontal and vertical deflection signals (X, Y) at wiper arms 74, 76 respectively are sinusoidal over 360 degrees rotation of the wipers. The Y output at lead 50 will be displaced from the X output at lead 47 by 90 electrical degrees. By way of illustration with a signal $+e_1$ at terminal 61 and a signal $-e_1$ at terminal 63 and with terminals 62, 64 grounded, the X, Y outputs at leads 47, 50 will be displaced by 90 degrees and will generate a circular locus 82 (FIG. 4) when they are applied to the orthogonal deflection system of scope 48. Thus the voltage $|e_1|$ may be displayed on scope 48 as a single vector point on the circular locus 82 at a location determined by the angular position of arms 74, 76. However, due to the impedance distribution of arms 68–71 required to obtain sinusoidal X, Y signals and the circular locus 82, when terminals 61, 63 are grounded and terminals 62, 64 are energized by signals $-e_2$, $+e_2$, the X, Y signals at leads 47, 50 will not be truly sinusoidal but will follow the relationships $X=|e_2|\cos^3 \theta$, $Y=|e_2|\sin^3 \theta$ which will generate a four cusp hypocycloid locus 84 when displayed on scope 48. When terminals 61, 63 and 62, 64 are energized simultaneously the vector point display for 360 degrees rotation of arms 74, 76 will be generally circular with some distortion due to the non-circular configuration of the locus 84. Stated differently, the X, Y signals at leads 47, 50 will be generally sine and cosine signals proportional to quadrature components of the difference signal developed by amplifier 28. Although the vector point rotation should follow a circular path for optimum selectivity and sensitivity, the X and Y signals may be non-sinusoidal so long as the X, Y locus is a closed loop, such as the locus 84, that does not include the point $X=0$, $Y=0$. Thus the term "quasi sinusoidal functions" as used in this application includes true sine and cosine functions and $\sin^3$ and $\cos^3$ functions as well as quadrature non-sinusoidal periodic functions that do not simultaneously pass through zero and that sufficiently resemble sinusoidal functions, that each function decreases during one half period and increased during the other half period, to achieve a useful vector point rotation as described in this application.

Figure 6A:
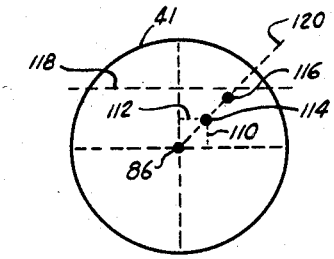
FIGURES 6a and 6b are views of a display on the cathode ray tube and illustrate variations in the display that can be obtained with the deflection attitude control shown in FIG. 3.
Figure 6B:
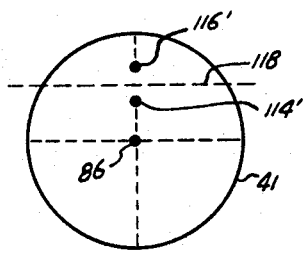

The operation of the testing device shown in FIG. 1 and the deflection attitude control shown in FIG. 3 may be best understood in connection with the waveforms illustrated in FIG. 2 and the oscilloscope presentations illustrated in FIGS. 6a and 6b. With the circuit illustrated in FIG. 1 energized by a square wave 88 (FIG. 2a) and assuming that the impedances of tank circuits 16, 18 are balanced, no different signal will appear in the output of amplifier 28 and the spot on the oscillocope 48 will be at a null position designated by numeral 86 (FIGS. 6a, 6b). The impedance of tank circuit 18 is then adjusted to a standard as by loading tank circuit 18 with a standard specimen or by varying impedance elements in the tank circuit 18 while tank circuit 16 is loaded with a standard specimen until the output from amplifier 28 is nulled. The output signal from reference tank circuit 18 is designated by numeral 90 (FIG. 2b) and for purposes of illustration is assumed to be in phase with the square wave drive 88. When the apparent impedance of probe 20 is influenced by one of the test specimens 22, any differences in the characteristics of the specimen 22 from the standard will provide at the output of amplifier 28 a sinusoidal difference signal 91 (FIG. 2d) representing differences in the phase and amplitude of the signals from tank circuits 16, 18. The difference signal 91 is applied to the sampling circuits 30, 32. A delayed square wave 92 (FIG. 2c) is developed by the delay circuit 34 and applied to sampling circuit 32. Positive going portions of the square waves 88, 92 are used to develop sampling pulses 96, 98 (FIG. 2d) in the sampling circuits 30, 32, respectively. When the sampling circuit 30 is gated open by the gating pulse 96, an instantaneous value 100 of the difference signal 91 is sampled and stored as a unidirectional output signal 102 (FIG. 2e). When the sampling circuit 32 is gated open by the sampling gating pulse 98 an instantaneous value 104 of the difference signal 91 is sampled and stored as a unidirectional output signal 106. In steady state operation the unidirectional signals 102, 106 may be at a substantially constant level as illustrated in FIG. 2e over several cycles of sampling.

The unidirectional output signal 102 ($+e_1$, FIG. 3) from sampling circuit 30 is applied directly to terminal 61 in the deflection attitude control 40 and is also inverted and applied to the terminal 63. Similarly the unidirectional output signal 106 ($+e_2$, FIG. 3) developed by sampling circuit 32 is applied directly to terminal 64 and is also inverted and applied to terminal 62. Assuming an arbitrary position of the wiper arms 74, 76, such as that shown in FIG. 3, the vertical deflection signal derived by arm 76 might deflect the spot vertically a distance designated by numeral 110 (FIG. 6a) whereas the horizontal deflection voltage from arm 74 might deflect the spot horizontally a distance designated by numeral 112 to a spot position 114. Assuming that when a second test specimen having characteristics different from those of the first specimen 22 influences the apparent impedance of probe coil 20, the difference output from amplifier 28 when sampled and displayed on oscilloscope 48 causes the spot to be displayed at a different position, for example, a position designated by numeral 116. A vertical displacement between spots 114, 116 represents a difference in some particular characteristic in the two test specimens and variations in that characteristic over a number of specimens will be presented by vertical distribution of the spots on the display. Sorting of the specimens in accordance with variations in that characteristic can be based on vertical deflection or deviation levels such as a level indicated by a dashed line 118.

However, if the specimens are being tested for a second characteristic corresponding to an impedance variation represented by a displacement between spots 114, 116 in a direction along an axis 120, the vertical deflection voltage no longer is a true representation of the difference. Sorting for the second characteristic based on the level 118 will not be accurate. By rotating arms 74, 76 the displacement between spot positions 114, 116 along the axis 120 can be presented as a vertical displacement on scope 48 as illustrated by spot positions 114' and 116' in FIG. 6b, and separation at the level 118 based on differences in the second desired characteristic is achieved. For the phrase relationships illustrated in FIGS. 2a–2e when the difference signal 91 is sampled at the peak point and the zero crossing of the drive signal 88, the unidirectional voltage 102 developed by sampling circuit 30 is proportional to a resistive component of the impedance difference in tank circuits 16, 18 whereas the unidirectional voltage 106 developed by sampling circuit 32 is proportional to a reactive component of the difference. However, the unidirectional deflection signals developed by the deflection attitude control 40 will be proportional to some orthogonal combination of the reactive and resistive components depending on the particular position of arms 74, 76. Thus the effect of the deflection attitude control 40 is to transform the vector point by rotating resistance and reactance axes of an impedance plane relative to the deflection axes of scope 48 so that any combination of the resistive and reactive impedance components can be selected for display as a vertical deflection on the oscilloscope 48.

Automatic sorting also requires that the sorting control 56 be reset to respond to the next specimen influencing the impedance of coil 20. When one specimen leaves coil 20, a large difference signal appears in the output of amplifier 28 due to a large difference in the apparent impedance of coil 20 (air loaded) and the impedance of tank circuit 18. This large difference signal produces a large vertical deflection voltage which is sensed by the reset circuit 58 to initiate reset of the sorting gate control 56. The large deflection voltage due to coil 20 being air loaded will deflect the spot off of the display when a specimen leaves coil 20. Automatic sorting requires that when the next specimen approaches coil 20, the vertical deflection voltage will decrease in a direction such that the spot emerges onto the display from a reset location into the lowest sorting group below level 118. If the spot were permitted to emerge onto the display in any arbitrary direction, the spot might pass through higher sorting levels on its path to the actual difference value and thus result in spurious operation of the sorting gates 59. However arms 74, 76 can be adjusted to produce the presentation described in connection with FIG. 6b, along the vertical deflection axis and also cause the spot 116 to emerge onto the display from the bottom past the sorting level 118 when the vertical deflection voltage decreases from reset. This gives a true indication of the actual difference value without spurious actuation of the sorting gates 59.

Figure 4:
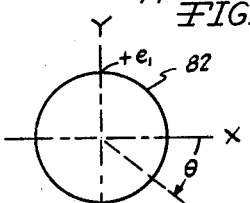
FIGURES 4 and 5 are diagrams illustrating operation of the deflection attitude control shown in FIG. 3.
Figure 5:
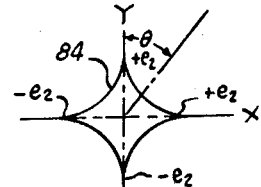
Figure 7:
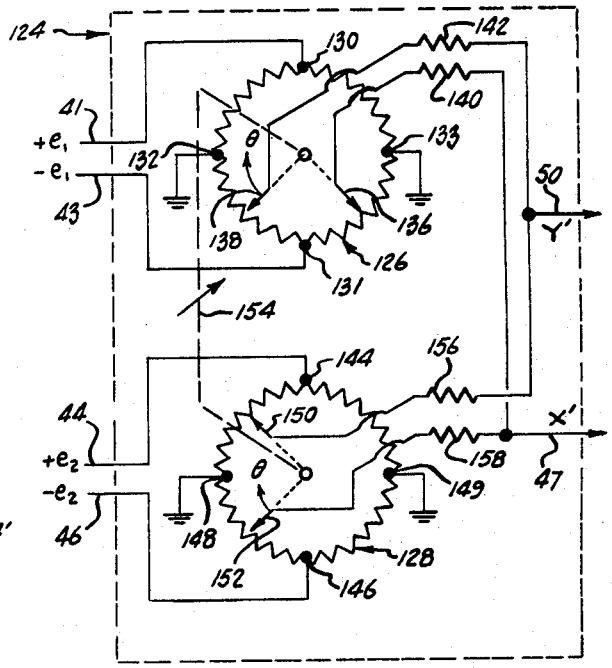
FIGURE 7 is a circuit diagram of another deflection attitude control of the present invention.

FIG. 7 illustrates a deflection attitude control 124 which eliminates the distortion due to the noncircular locus (FIG. 5) of the control 40 (FIG. 3). The control 124 generally comprises a pair of closed loop resistors 126, 128 each of which is substantially identical to the closed loop resistor 60 (FIG. 3). The control 124 is substantially similar to control 40 (FIG. 3) except for the manner of connecting the closed loop resistors 126, 128 to the sampling circuits 30, 32 and to oscilloscope 48. Resistor 126 has a pair of input terminals 130, 131 which are connected respectively to the sampling circuit 30 and inverter 42 by leads 41 and 43. The other pair of opposite terminals 132, 133 are grounded so that the outputs from orthogonal wiping arms 136, 138 are substantially sinusoidal and the X, Y locus is circular as illustrated in FIG. 4. Arm 136 is connected through an output resistor 140 to the lead 47 whereas arm 138 is connected through a resistor 142 to the lead 50. Similarly the resistor 128 has one pair of opposite terminals 144, 146 which are connected to sampling circuit 32 and inverter 45 by lines 44, 46. The other pair of opposite terminals 148, 149 are grounded. A pair of orthogonal wiper arms 150, 152 are associated with resistor 128 and are displaced 90 degrees in a clockwise direction from the arms 136, 138. Arms 150, 152 are mechanically ganged to arms 136, 138 for co-rotation as indicated by a dashed line 154. Arm 150 is connected to lead 50 through a resistor 156 whereas arm 152 is connected to lead 47 through a resistor 158. Rotation of arms 150, 152 through 360 degrees relative to resistor 128 develops sinusoidal signals and a circular locus of the type illustrated in FIG. 4. The two closed loop resistors 126, 128 are used so that both quadrature signals from sampling circuits 30, 32 can be applied to the opposite terminal pair (130, 131 or 144, 146, FIG. 7; 61, 63, FIG. 3) that yields the true circular locus (FIG. 4) due to the impedance distribution of the resistor. The operation of the deflection attitude control 124 (FIG. 7) is substantially identical to the operation of the deflection attitude control 40 (FIGS. 1 and 3) except that each resistor provides substantially true sinusoidal outputs which are summed at leads 50, 42. For example with the input polarities and relative positions of wiping arms 136, 138, 150, 152 illustrated in FIG. 7 and assuming that $\theta=0$ when arm 138 is at terminal 130, arm 136 is at terminal 132, arm 150 is at terminal 149 and arm 152 is at terminal 144, for rotation in clockwise direction through an angle $\theta$ the vertical deflection voltage, Y', at lead 50 will be substantially proportional the relationship $|e_1| \cos \theta - |e_2| \sin \theta$ and the horizontal deflection voltage, X', at lead 42 will follow the relationship $|e_1| \sin \theta + |e_2| \cos \theta$. By rotating arms 136, 138, 150, 152 any combination of resistive and reactive components of the apparent difference impedance can be presented as a vertical deviation on the oscilloscope 48 and proper entry direction can be obtained.

Figure 8:
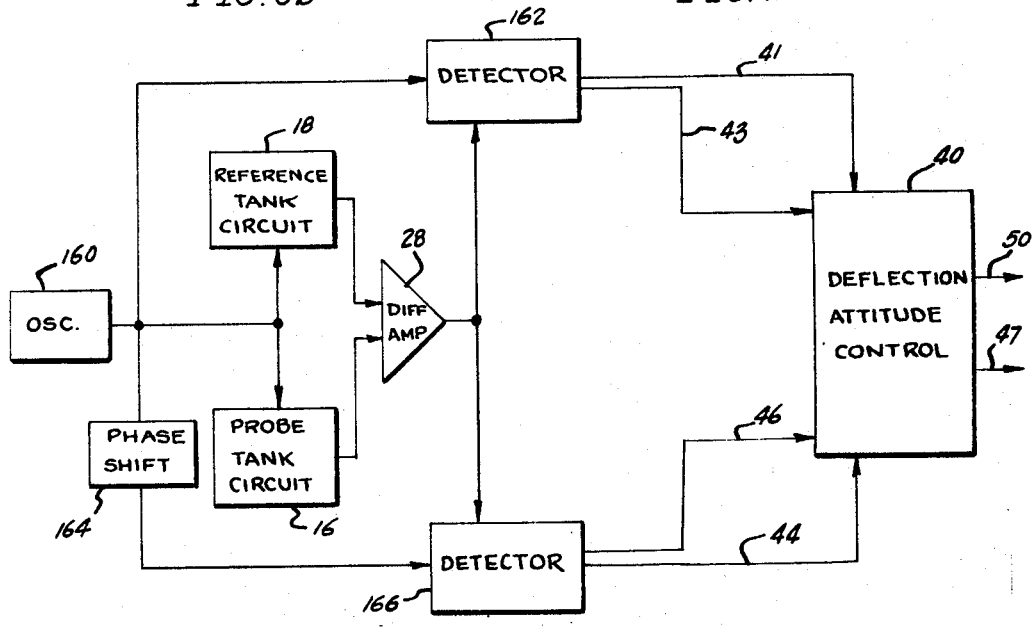
FIGURE 8 is a block diagram illustrating a portion of another type of eddy current testing device which has a deflection attitude control of the present invention.

FIG. 8 illustrates in block form a portion of an eddy current testing device of the general type disclosed in the aforementioned Foerster patent to illustrate general application of a deflection attitude control 40 of the present invention. In FIG. 8 circuits corresponding to those in FIG. 1 are designated by like reference numerals. An oscillator 160 provides a sinusoidal drive signal which is applied to a probe tank circuit 16 and to a reference tank circuit 18. The drive signal from oscillator 160 is also applied directly to a detector 162 and through a 90 degree phase shift circuit 164 to a second detector 166. The tank circuits 16, 18 are in turn coupled to a differential amplifier 28 to provide a difference signal representing phase and amplitude deviations of a test specimen from a standard. The difference signal from amplifier 28 is applied to the detectors 162, 166. Detectors 162, 166 may be conventional detection circuits responsive to sinusoidal inputs to provide four unidirectional voltages having relative magnitudes determined by the magnitude and phase of the difference signal from amplifier 28 relative to the magnitude and phase of the signal from oscillator 160. For example one such detection circuit is described in detail in the aforementioned Foerster patent. The four output signals from detectors 162, 166 contain substantially the same information as the output signals from sampling circuits 30, 32 and inverters 42, 45 (FIG. 1). The four unidirectional signals from detectors 162, 166 are applied to the deflection attitude control 40 via leads 41, 43, 44, 46 in the manner described in connection with FIGS. 1 and 3 to develop vertical and horizontal deflection signals at leads 50, 47. The operation of the deflection attitude control 40 (FIG. 8) is substantially identical to that disclosed in connection with FIGS. 1 and 3. However, by using the control 40 in the circuit illustrated in FIG. 8, the need for a 360 degree phase shift circuit previously employed is eliminated.

The eddy current testing devices described hereinabove and in particular the deflection attitude controls (40, FIGS. 1 and 3; 124, FIG. 7) are particularly suited for multi-frequency testing since the need for a 360 degree phase shift circuit is eliminated. The deflection attitude controls described herein are completely independent of frequency. By eliminating the need for a 360 degree phase shift circuit, a square wave drive and single shot delay can be used to drive the sampling circuits 30, 32 directly. This is advantageous since the crystal controlled oscillator 10 and the frequency divider 12 are a convenient and economical way to provide stable frequency square wave signals over a wide range of test frequencies. The 360 degree phase shift circuits previously employed are designed for sinusoidal signals not square wave signals.

The test instruments constructed in accordance with the present invention may be operated at test frequencies over a wide frequency range, for example, from below 100 cycles per second to several hundred kilocycles by varying the square wave drive from the divider 12 and varying components in the tank circuits 16, 18 and the delay capacitor 36. Various probe circuits known in the art may be used in place of the reference tank circuit 18 and the probe tank circuit 16 illustrated in FIG. 1. Such circuits include, for example, single primary test coils, single primary and single secondary coils, bridge circuits with two primary coils, bridge circuits with two primary and two secondary coils and self comparison coil arrangements.

It will be understood that the eddy current testing apparatus which is herein described and disclosed is presented for purposes of explanation and illustration and is not intended to indicate the limits of the invention, the scope of which is defined in the following claims.

What is claimed is:

1. An eddy current testing device adapted to measure a characteristic of a workpiece, said device including the combination of a source of alternating current, a test coil connected to said source, said test coil being adapted to be coupled to said workpiece whereby said test coil provides an output signal which varies in phase and amplitude in accordance with said characteristic of said workpiece, means coupled to said source for providing a pair of sampling signals which are displaced in phase from each other and have a predetermined phase relation to said alternating current, a pair of sampling means coupled to said test coil and responsive to said pair of sampling signals and effective to provide a pair of component signals proportional to the instantaneous values of said output signal at a pair of phase angles determined by the phase angles of said sampling signals, coupling means, and output means, said coupling means being effective to couple said output means to at least one of said sampling means, said coupling means including adjustable resolving means effective to resolve the component signals into a pair of output signals, said resolving means being adjustable whereby one of the output signals does not vary with changes in said characteristic and the other output signal does vary as a function of said characteristic.

2. The combination of claim 1 wherein the resolving means includes a resistive bridge having the first pair of opposite corners thereof coupled to one of said sampling means and the other pair of opposite corners thereof coupled to the other of said sampling means, and a pair of moveable contacts moveable around said bridge and coupled to the output means.

3. The combination of claim 1 wherein the resolving means includes a resistive bridge having four resistances joined together at four separate corners, one pair of said opposite corners being coupled to one of said sampling means and the other of said opposite corners being coupled to the other of said sampling means, and a pair of moveable contacts engaging said resistances and being coupled to the output means, said outputs being movable into a position wherein one of said output signals remains constant and the other of said output signals varies as a function of the characteristics.

4. The combination of claim 3 wherein the output means is responsive to the other of said output signals.

References Cited

UNITED STATES PATENTS

| | | | |
|---|---|---|---|
| 2,806,992 | 9/1957 | Foerster | 324—34 |
| 3,006,993 | 11/1961 | Barndt | 178—7.2 |
| 3,302,105 | 1/1967 | Libby. | |
| 3,337,796 | 8/1967 | Hentschel | 324—40 |

RUDOLPH V. ROLINEC, *Primary Examiner.*

P. A. URIBE, *Assistant Examiner.*